United States Patent [19]
Obrist

[11] Patent Number: 5,487,539
[45] Date of Patent: Jan. 30, 1996

[54] APPARATUS FOR CLAMPING A WORK PIECE IN A WELL DEFINED POSITION

[75] Inventor: Basil Obrist, Gontenschwil, Switzerland

[73] Assignee: Erowa AG, Reinach, Switzerland

[21] Appl. No.: 237,195

[22] Filed: May 3, 1994

[30] Foreign Application Priority Data

May 4, 1993 [DE] Germany .................. 43 14 629.5

[51] Int. Cl.⁶ .................................................. B23Q 1/06
[52] U.S. Cl. ............................................................ 269/309
[58] Field of Search ............................... 269/20, 21, 32, 269/309, 310, 900

[56] References Cited

U.S. PATENT DOCUMENTS

| | | | |
|---|---|---|---|
| 3,858,867 | 1/1975 | Claycomb | 269/310 |
| 4,390,172 | 6/1983 | Gotman | 269/309 |
| 4,444,541 | 4/1984 | Bergman | 269/304 |
| 4,586,702 | 5/1986 | Chambers | 269/310 |
| 4,934,680 | 6/1990 | Schneider | 269/309 |

FOREIGN PATENT DOCUMENTS

0356217  2/1990  European Pat. Off. .............. 269/309

*Primary Examiner*—Robert C. Watson
*Attorney, Agent, or Firm*—Tarolli, Sundheim & Covell

[57] ABSTRACT

The clamping apparatus comprises a base member adapted to be fixed in the working area of the machining apparatus and a work piece carrier member adapted to be put onto the base member and to be clampingly fixed to the base member, the work piece carrier member being adapted to receive a work piece to be machined. Aligning elements fixed to the work piece carrier member and to the base member and cooperating in pairs define the position of the work piece carrier member in X-, Y- and Z-direction as well as with regard to its angular orientation. For the definition of the X-Y-position, three aligning element pairs are provided. Two of them are located opposite to each other at the two lateral end regions of the clamping apparatus and define the position along the Y-axis which runs perpendicular to a connection line between the two aligning element pairs. The third aligning element pair is located in the center between the two other ones and defines the position in the X-axis. For clamping the work piece carrier member to the base member, the base member is provided with two clamping members which are located each between the central and one of the lateral aligning element pairs.

27 Claims, 9 Drawing Sheets

APPARATUS FOR CLAMPING A WORK PIECE IN A WELL DEFINED POSITION

FIELD OF THE INVENTION

The present invention refers to an apparatus for clamping a work piece in a well defined position in the working area of a machining apparatus, comprising a base member adapted to be fixed in the working area of the machining apparatus, a work piece carrier member adapted to be put onto the base member and to be clampingly fixed to the base member, the work piece carrier member being adapted to receive a work piece to be machined.

The apparatus comprises first aligning means provided on the base member and second aligning means provided on the work piece carrier member. The first and second aligning means cooperate in pairs with each other upon putting the work piece carrier member onto the base member to align the position of the work piece carrier member in three coordinate axes running perpendicularly to each other and with regard to its angular orientation.

Clamping means generate a clamping force which keeps the work piece carrier member on the base member in a position defined by the first and second aligning means.

The first and second aligning means comprise first aligning element pairs including first and second stop surfaces cooperating with each other to define the position of the work piece carrier member in a coordinate axis (Z) running parallel to the direction of the clamping force generated by the clamping means, and second aligning element pairs including each a conically cross sectioned aligning ruler member as well as a counterpart member having a matching centering slot. The aligning ruler members and the counterpart members cooperate with each other to define the position of the work piece carrier member in a coordinate plane which is set by the two other coordinate axes (X and Y).

PRIOR ART

In a clamping apparatus of this kind and known in the art, two pairs of linear aligning element pairs for setting the position of the work piece carrier member within the plane defined by the two coordinate axes X and Y are arranged along the periphery of a circle around a centrally located clamping means. Thereby, the line of action of the clamping means runs in the direction of the third coordinate axis Z. The operating flanges of the wedge shaped centering ruler members as well as the operating edges of the associated centering slots extend radially to the Z-axis. The centering slots are constituted by apertures in a common horizontal plate member which is elastically resilient in the direction of the Z-axis. This plate member is fixed to the work piece carrier member, while the centering ruler members are provided on the base member. The clamping means comprises a clamping chuck member with a ball locking mechanism located in the base member and a clamping pin member projecting from the work piece carrier member. The clamping pin member can be inserted into the clamping chuck member to clampingly fix the work piece carrier member to the base member.

Clamping apparatuses of this kind have proven to be very reliable and are characterized by an extremely high positional accuracy, even when the work piece carrier member is repeatedly clamped to and removed from the base member. They are most suitable for relatively small work pieces and in cases in which the forces exerted to the work piece during a machining operation are relatively small, e.g. in the case of an electroerosive machining of a work piece.

In the case of machining or metal cutting of a work piece, the limited load handling capacity of such clamping apparatuses restricts the field of application essentially to work pieces with a size not greater than the size of the clamping apparatus itself. During the machining of bigger work pieces, loads can turn up at the clamping apparatus which, under certain circumstances, can become so high that the linear aligning elements and the clamping means are excessively strained and cannot fulfill any longer their function in the desired manner and, first and foremost, with the required accuracy. Particularly critical are torque forces around the Z-axis caused by machining forces and transmitted to the work piece carrier member. Such torque forces can generate excessively high pressures at the working edges of aligning elements which are responsible for the centering of the work piece in X-Y-direction with the result that the positional accuracy is impaired. These pressure can be kept within reasonable limits if bigger clamping apparatuses are used for the machining of bigger work pieces; in these big clamping apparatuses, the aligning element pairs are correspondingly stronger and have a greater radial distance from the Z-axis. The clamping apparatus herein before described and known in the art, however, is not suited due to its general design to be simply linearly enlarged in order to render it more suitable for the machining of big work pieces. Particularly, the central location of the clamping means is inappropriate since a single clamping means which is in the position to build up the required high clamping force would be too large. Thus, the clamping apparatus would be quite bulky and heavy and thereby unsuitable for practical handling. Moreover, the costs for such a clamping apparatus in an enlarged size would be too high.

A solution for clamping relatively large work pieces is disclosed in European Patent Nr. 0,403,428. Thereby, four clamping assemblies of a kind as herein before described are fixed to the four corners of a rectangular work piece carrier plate member. All four clamping assemblies are provided with aligning element pairs for setting the position along the Z-axis. Only a first one of the four clamping assemblies comprises not only two aligning element pairs for the definition of the position in the X-axis, but also two further aligning element pairs for the definition of the position in the Y-axis. Second and a third clamping assemblies located in the adjacent corners of the work piece carrier plate member each comprise only two aligning element pairs, in the case of the second clamping assembly for the definition of the position in the X-axis, in the case of the third clamping assembly for the definition of the position in the Y-axis. The fourth clamping assembly located in the corner which is diagonally opposite to the first clamping assembly is not provided with aligning element pairs for the definition of the position in the X-axis or in the Y-axis at all.

In view of the central arrangement of the clamping means in each of these clamping assemblies and to ensure an even tilt moment free loading of the clamping means, the linear aligning element pairs for the definition of the position in the X- and Y-axis are provided in duplicate in each of the first, second and third clamping assemblies. Since each two aligning element pairs of a clamping assembly is arranged diametrically opposite each other with regard to the central clamping means, totally four aligning element pairs are used to define the position in the X-axis and Y-axis, respectively, even if two of them would be sufficient for geometric reasons. The mutual alignment of the four aligning element pairs requires a particularly high degree of manufacturing and mounting accuracy in order to ensure that the reproducibility of the positioning is not impaired in spite of the geometrically over defined design. Moreover, the expenditure of four clamping assemblies each including separate clamping means is quite high for the positionally defined clamping of a single work piece.

OBJECTS OF THE INVENTION

It is an object of the invention to provide an apparatus for clamping a work piece in a well defined position in the working area of a machining apparatus which has an improved design as compared with the clamping apparatuses for the clamping of relatively big work pieces known in the art.

It is a further object of the invention to provide an apparatus for clamping a work piece in a well defined position at the working area of a machining apparatus which avoids the disadvantages of the known clamping apparatuses.

It is a still further object of the invention to provide an apparatus for clamping a work piece in a well defined position at the working area of a machining apparatus which has a more compact design with simultaneously increased load handling capacity, as compared with the known clamping apparatuses.

Finally, it is an object of the invention to provide an apparatus for clamping a work piece in a well defined position at the working area of a machining apparatus which is provided but with the absolute minimum of aligning element pairs required for defining an unambiguous position of the work piece carrier member in the X- and Y-direction as well as with regard to its angular orientation.

SUMMARY OF THE INVENTION

In order to meet these and other objects, the invention provides an apparatus for clamping a work piece in a well defined position in the working area of a machining apparatus. The clamping apparatus according to the invention comprises a base member adapted to be fixed in the working area of the machining apparatus and a work piece carrier member adapted to be put onto the base member and to be clampingly fixed to the base member, the work piece carrier member being adapted to receive a work piece to be machined.

First aligning means are provided on the base member and second aligning means are provided on the work piece carrier member. The first and second aligning means cooperate in pairs with each other upon putting the work piece carrier member onto the base member to align the position of the work piece carrier member in three coordinate axes running perpendicularly to each other, and with regard to its angular orientation.

To keep the work piece carrier member in a position defined by the first and second aligning means on the base member, clamping means generating a clamping force are provided.

The first and second aligning means comprise first aligning element pairs including first and second stop surfaces cooperating with each other to define the position of the work piece carrier member in a coordinate axis (Z) running parallel to the direction of the clamping force generated by the clamping means.

Additionally, the first and second aligning means comprise second aligning element pairs including each a conically cross sectioned aligning ruler member as well as a counterpart member having a matching centering slot. The aligning ruler members and the counterpart members cooperate with each other to define the position of the work piece carrier member in a coordinate plane which is set by the two other coordinate axes (X and Y).

The two opposite end portions of the base member and of the work piece carrier member each are provided with one of the second aligning element pairs which together define the position of the work piece carrier member in a coordinate axis (Y) running perpendicular to the connection line between the two second aligning element pairs as well its angular orientation. A central portion of the base member and of the work piece carrier member between the two second aligning element pairs is provided with a further one of the aforementioned second aligning element pairs to define the position of the work piece carrier member in the third coordinate axis (X).

The clamping means comprises two synchronously operated clamping members, each one thereof being located between the centrally located second aligning element pair and one of the laterally located second aligning element pairs.

This clamping apparatus comprises just three aligning element pairs for the definition of the X- and Y-axes which are, together with the two clamping members, arranged essentially along a straight central connection line. Thereby, the two lateral aligning element pairs absorb the load caused by torque forces around the Z-axis. Consequently, the mutual distance between these two lateral aligning element pairs should be as long as possible. Thus, the clamping apparatus can be designed, with a certain length taken along the aforementioned connection line, comparatively narrow whereby its load handling capacity is determined essentially only by its length. In view of that, the overall size of the clamping apparatus may be adjusted to a size family of work pieces to be machined with much less expenditure.

According to a preferred embodiment of the clamping apparatus of the invention, the base member comprises a housing block, the upper side of which being provided with the first stop surfaces of the first aligning element pairs and with the one aligning elements of the second aligning element pairs and in which the clamping members are located. Thereby, the work piece carrier member comprises a work piece carrier plate member, the plane bottom side of which being provided with the other aligning elements of the second aligning element pairs. Preferably, the conically cross sectioned aligning ruler members are arranged on the work piece carrier member and the counterpart members having a matching centering slot are arranged on the base member. In this way, the work piece carrier plate member is free of any elements except the centering ruler members. All moving and active parts and elements of the clamping apparatus are located at and in the base member. Thus, the work piece carrier member constitutes a simple and relatively inexpensive component with low weight which facilitates its handling.

Preferably, in contrary to the known designs of clamping apparatuses with a common centering plate member having therein a plurality of centering apertures and in view of an increased load handling capacity, each of the counterpart members having a matching centering slot comprises two separate centering tongue members individually connected to the housing block of the base member and equipped with operating edges located opposite to each other and delimiting the centering slot. Similar as the centering plate member of the known clamping apparatus, the centering tongue members can be elastically flexible and can comprise a bending portion constituted by a region with reduced cross sectional area. In order to relieve the centering tongue members at least partially from the load exerted thereon and to ensure the motion back to their initial position, each associated pair of centering tongue members can be supported by a separate common spring bank member.

As far as the design of the clamping means is concerned, a solution is preferred in which each of the two clamping members comprises a swivelable pull lever member which engages the work piece carrier plate member when it is in its operating position. For this purpose, the work piece carrier plate member of the work piece carrier mender can be provided with two apertures in each of which is provided a projection, whereby each of the pull lever members, upon putting the work piece carrier member onto the base member, penetrates the corresponding aperture in the plate member and engages the projection if the pull lever member is in its operating position.

It has proven very practical if there is assigned to each pull lever member a driving means for swiveling the pull lever member from its rest position into its operating position and for generating the clamping force. Thereby, the driving means can comprise two working cylinders located in the housing block and having two pistons moving in opposite directions. The pistons are adapted to be pressurized on both sides by means of a pressure medium and are directly operatively connected to one of the two pull lever members. The direct operative connection can be realized e.g. by means of a wedge gear assembly.

In practice, it can happen that the pressure medium supply to the clamping apparatus is interrupted or must be stopped during a machining operation, e.g. when the clamping apparatus has to be rotated to a degree which exceeds the length of the pressure medium supply pipes. Thus, advantageously, means are provided for maintaining the clamping force of the pull lever member during an interruption of the pressure medium supply to the piston. These means e.g. can consist in the fact that the wedge angle of the wedge gear assembly is chosen such that the wedge gear assembly is self locking under the influence of the clamping force effective at the pull lever member. Moreover, a pressure spring can be provided which acts on the piston and supports the frictional forces of the self locking wedge gear assembly.

An essential requirement for a reliable operation of the clamping apparatus is that the contact surfaces of the aligning elements which are decisive for an exact positioning are absolutely free of dust and dirt prior to putting the work piece carrier member onto the base member, and that these contact surfaces are kept free of dust and dirt also during a machining operation. For this purpose, on the one hand, means can be provided for generating an air curtain between the housing block and the work piece carrier plate member in order to prevent dirt and dust from penetrating the space there between prior to clamping the work piece carrier member to the base member. On the other hand, means can be provided for blowing a jet of pressurized air against the aforementioned contact surfaces to clean them from dust and dirt. Finally, it can be advantageous if the space between the housing block and the work piece carrier plate member, in which the aligning elements are located, is air tightly sealed as soon as the work piece carrier member is clamped onto the base member.

BRIEF DESCRIPTION OF THE DRAWINGS

In the following, an embodiment of the clamping apparatus according to the invention will be further described, with reference to the accompanying drawings, in which.

DETAILED DESCRIPTION OF A PREFERRED EMBODIMENT

The clamping apparatus shown in the drawings comprises a base member to be fixed at the working location of a machining apparatus and a work piece carrier member 2 to be put onto the base member 1 and to be fixed thereto in an exactly predetermined and well defined position.

Figure 1:
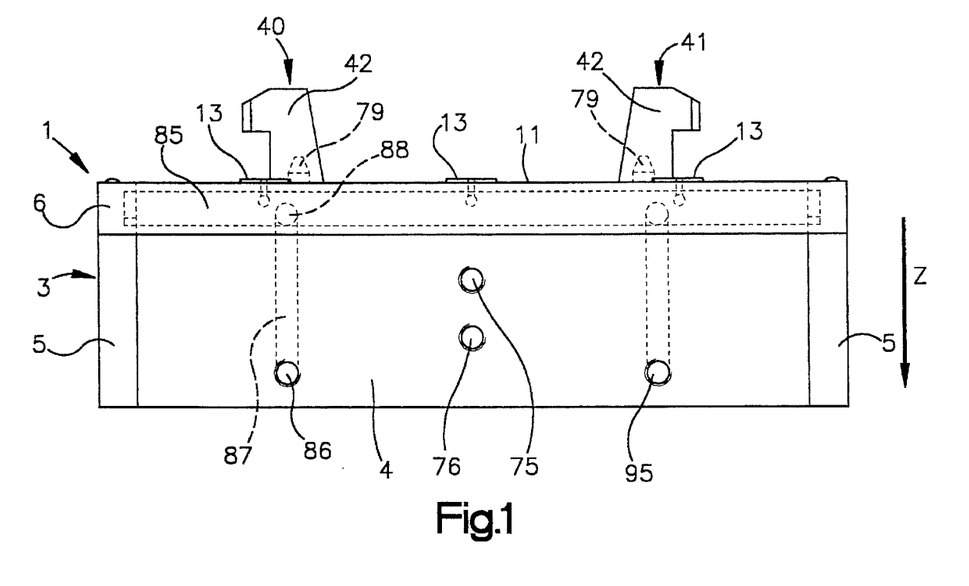
FIG. 1 shows a side view of the base member of the clamping apparatus.
Figure 2:
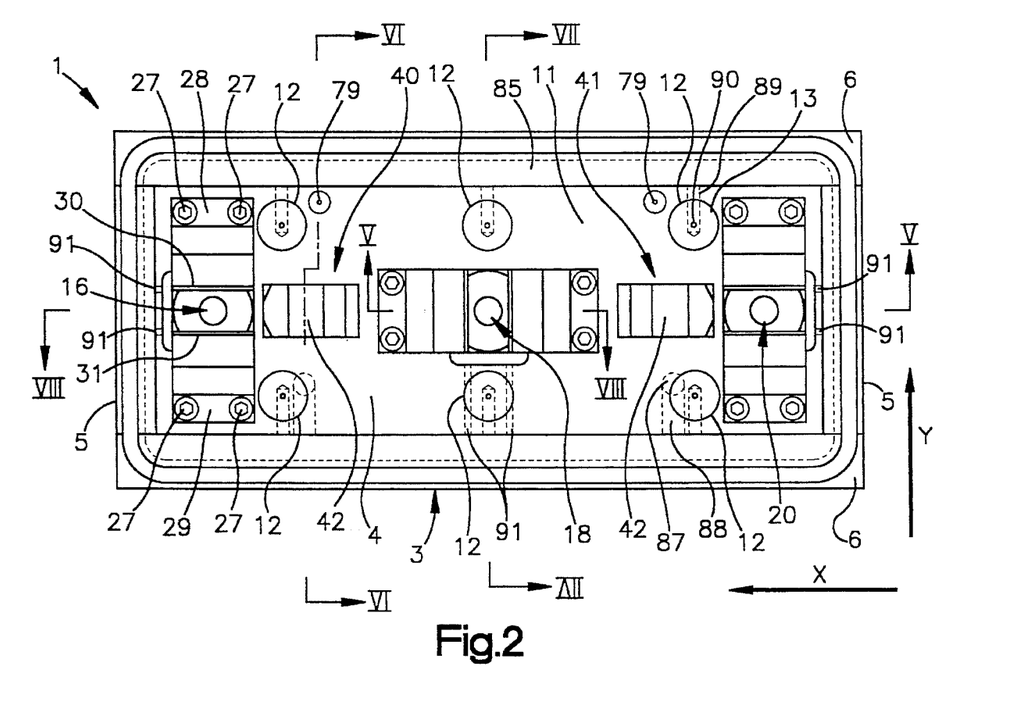
FIG. 2 shows a top view of the base member.
Figure 3:
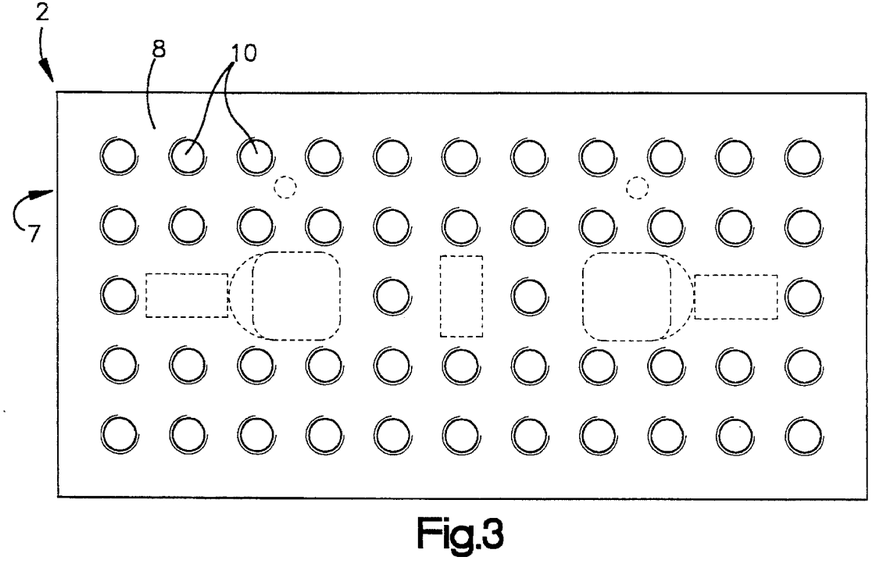
FIG. 3 shows a top view of the work piece carrier member of the clamping apparatus.

According to FIGS. 1 and 2, the base member 1 comprises an elongate, rectangular parallelepiped shaped housing 3, including a housing block 4. Both front faces thereof are provided each with a cover member 5, and the longitudinal edges of its top surface are provided each with a peripheral strip member 6 fixed thereto, e.g. by means of not shown screws. According to FIGS. 3 and 4, the work piece carrier member 2 comprises a rectangular plate member 7 having two flat surfaces 8 and 9 running parallel to each other on opposite sides of the plate member 7. The top surface 8 of the plate member 7 is provided with a plurality, for instance with 48 threaded bores 10 which are arranged in a grid-like manner; these threaded bores 10 serve for fixing a work piece (not shown) to the work piece carrier member 2. It is understood that other or additional fixing means can be provided.

The top surface 11 of the housing block 4 and the bottom surface 9 of the work piece carrier plate member 7 each are provided with aligning elements cooperating in pairs which align the work piece carrier member 2 with reference to the base member 1 in three coordinate axes X, Y and Z, each running perpendicular to the two other ones, and with regard to its angular position.

To these aligning elements belong six projections 12 which are provided on the top surface 11 of the housing block 4 in regular distribution. The end surfaces thereof form the stop surfaces 13 for defining the position of the work piece carrier member 2 along the Z-axis. In the clamped condition of the work piece carrier member 2, the plate member 7 with its plane bottom surface 9 rests on the stop surfaces 13 of the housing block 4. The corresponding surface portions 14 of the plate member 7 which form the opposite stop surfaces are emphasized in FIG. 4 by hatching.

Figure 4:
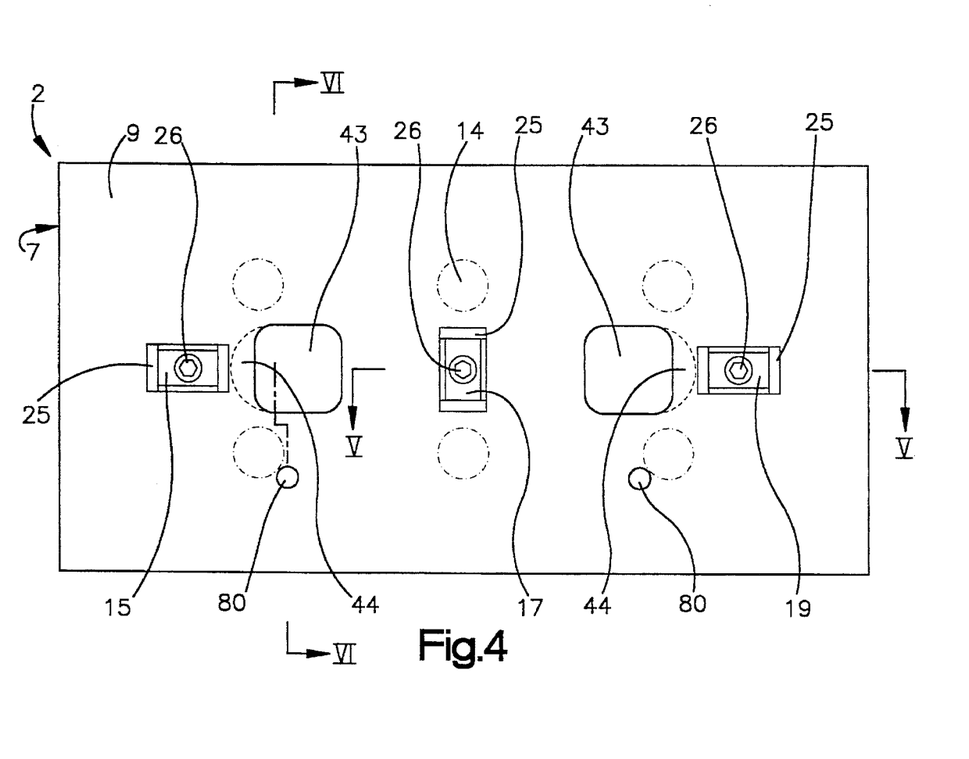
FIG. 4 shows a view of the bottom of the work piece carrier member.

For defining the position of the work piece carrier member 2 in a X-Y coordinate plane set by the two coordinate axes X and Y, there are provided three linear aligning element pairs 15, 16; 17, 18; 19, 20. Each aligning element pair comprises first aligning elements and second aligning elements. The first aligning elements are located at and fixed to the work piece carrier member 2; they have the form of aligning ruler members 15, 17 and 19, respectively, having a conical cross section. The second aligning elements 16, 18 and 20, respectively, serve as counterparts of the first aligning elements, are located at and fixed to the base member 1 and are provided with a centering slot matching the shape of the conical aligning ruler members. As can be seen in FIGS. 2 and 4, first and second aligning element pairs 15, 16 and 19, 20, respectively, are located at opposite end regions of the base member 1 and the work piece carrier member 2, respectively. These first and second aligning element pairs together define the position of the work piece carrier member 2, (a) along the Y-axis which runs perpendicular to the connecting line between the first and the second aligning element pairs, and (b) with regard to the angular orientation of the work piece carrier member 2. In the center between the first and second aligning element pairs, the third aligning element pair 17, 18 is located for defining the position of the work piece carrier member along the X-axis which coincides with the aforementioned connecting line between the first and second aligning element pairs 15, 16 and 19, 20, respectively.

The aligning ruler members 15, 17 and 19 belonging to the work piece carrier plate member 7 are received in grooves 25 provided in the surface of the plate member 7 and fixed therein by means of screws 26. On the other side, each of the aligning elements 16, 18 and 20 constituting the aforementioned centering slots comprise two separate centering tongue members 28 and 29 fixed to the housing block 4 of the base member 1 by means of screws 27. Two adjacent centering tongue members 28 and 29 each have an operating edge 30 and 31, respectively, directed towards each other and thereby delimiting the aforementioned centering slot. As can be clearly seen in FIG. 5, these centering tongue members 28 and 29 are received in each case in a recess 24 provided in the top surface 11 of the housing block 4. Moreover, the centering tongue members 28, 29 can be elastically bent; for this purpose, they are provided with a bending zone 32 and 33, respectively, which is constituted by a portion with reduced cross sectional area. Under load, the two centering tongue members 28 and 29 rest on a separate spring bank in order to relieve the strain on the centering tongue members 28, 29 and to ensure their return to the rest position shown in FIG. 5. The spring bank consists of two Belleville spring members 34 which rest on the flange 35 of a sleeve member 36. The spring members 34 are fixed in their operating position by the cooperation of the aforementioned flange 35 and an annular washer 37 which latter one is kept in position by the head of a screw 38 inserted into the sleeve 36.

The clamping means which serve for keeping the work piece carrier member 2 in a position on the base member 1 defined by the aligning elements 12,14; 15,16; 17,18 and 19,20 comprises two synchronously operated clamping members 40 and 41 which are each located between an end-sided (15,16 and 17,18, respectively) and the central (19,20) linear aligning element pairs. The clamping forces exerted by the clamping means run parallel to the Z-axis.

Referring now to FIGS. 1 and 2 again, it can be seen that each of the two clamping members 40 and 41 comprises a swiveling pull hook member 42 which engages, when it is in its operating position, the plate member 7 of the work piece carrier member 2. For this purpose, the plate member 7 is provided with two apertures 43 in each of which is provided a projection 44, such that each pull lever member 42 engages the corresponding aperture 43 of the plate member 7 upon putting the work piece carrier member 2 onto the base member 1. As soon as the pull lever members 42 are swiveled into their operating position, the projections 44 each are engaged by the associated pull lever member 42.

Figure 5:
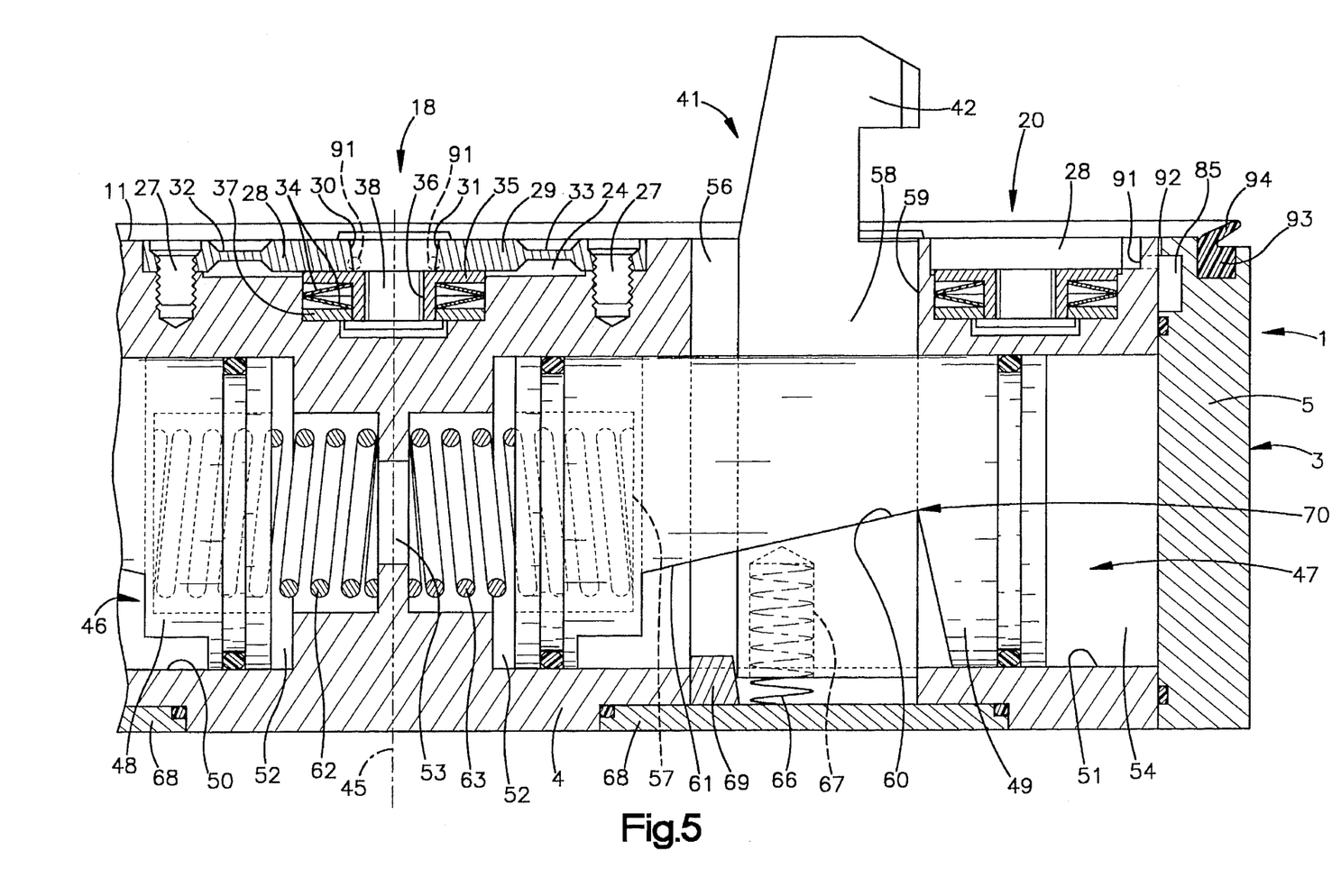
FIG. 5 shows a partial longitudinal sectional view of the base member, taken along the line V—V in FIG. 2, and in an enlarged scale.
Figure 6:
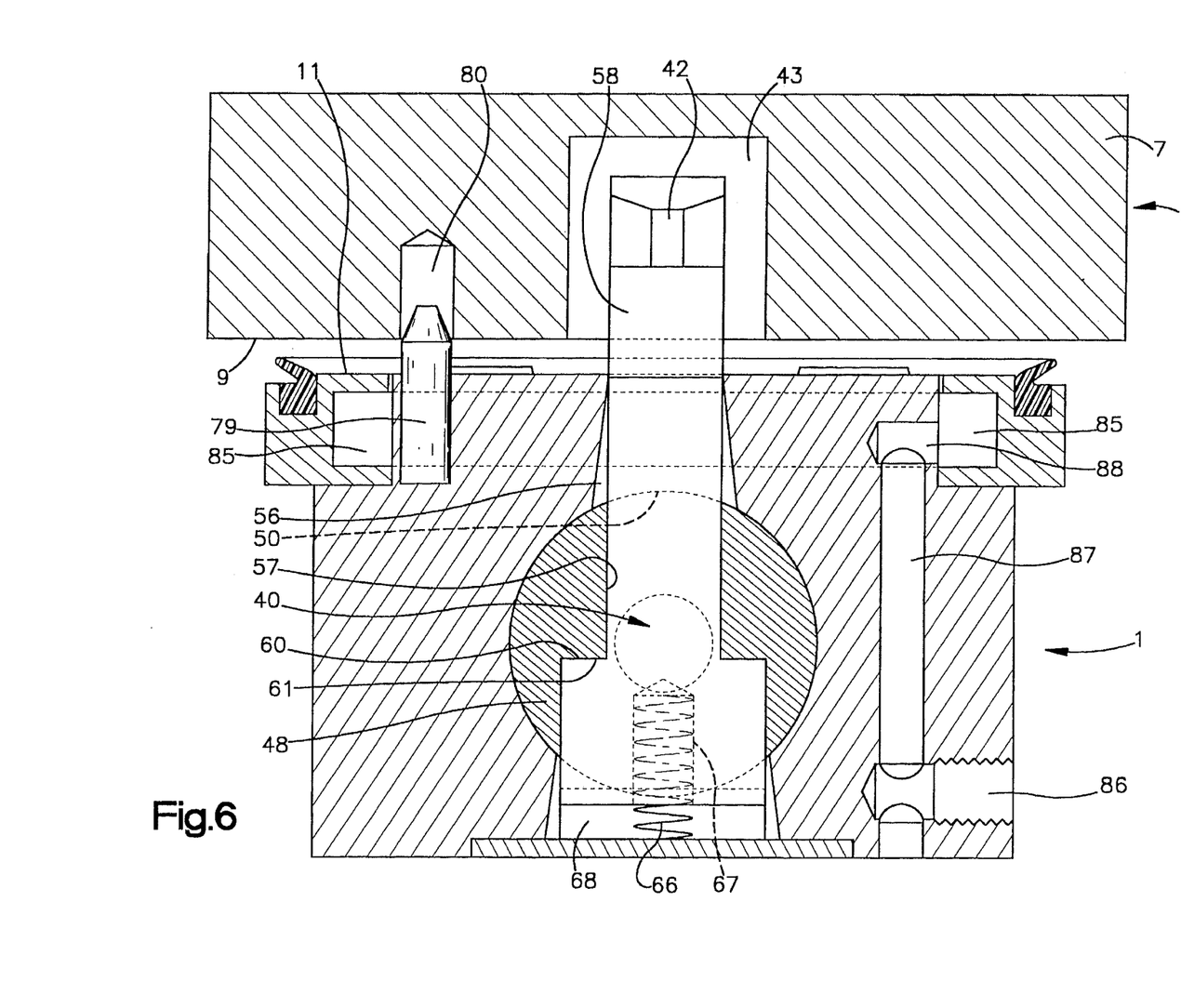
FIG. 6 shows a cross sectional view of the clamping apparatus, taken along the lines VI—VI in FIGS. 2 and 4, and in an enlarged scale.
Figure 7:
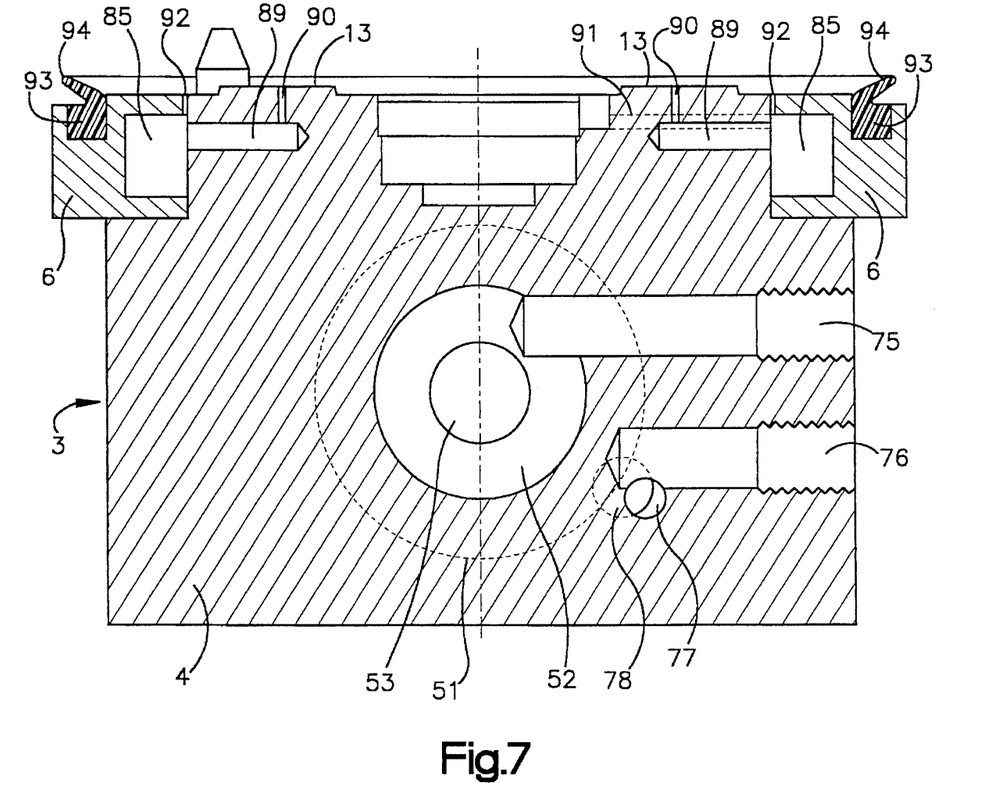
FIG. 7 shows a cross sectional view of the base member, taken along the line VII—VII in FIG. 2, and in an enlarged scale.
Figure 8:
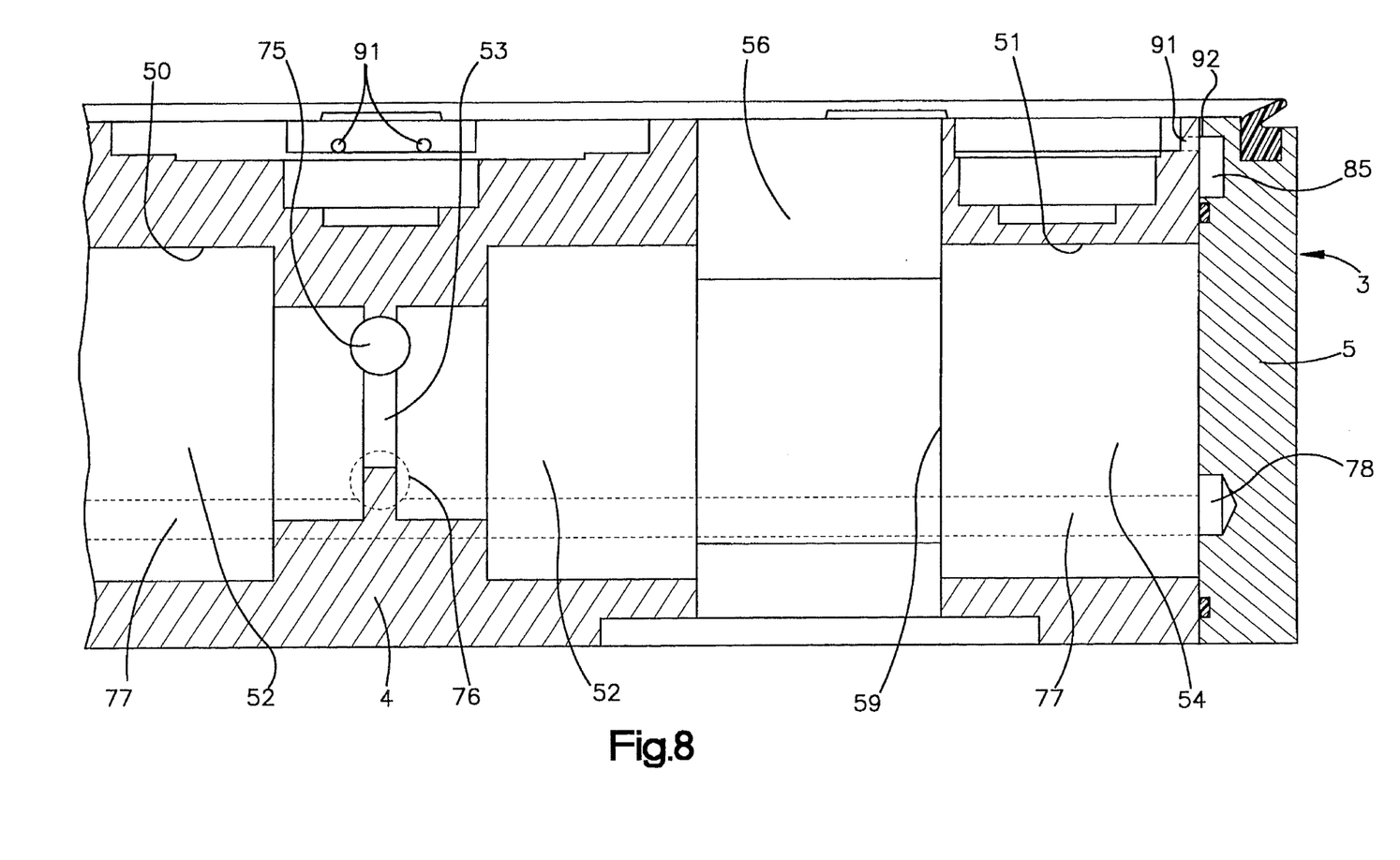
FIG. 8 shows a partial longitudinal sectional view of a housing block of the base member, taken along the line VIII—VIII in FIG. 2, an in an enlarged scale.

Further details of the clamping members 40, 41 are evident from FIG. 5 drawn in a greater scale, and from the associated sectional views according to FIGS. 6–8. It must be noted that FIG. 5 shows only one half of the base member 1, but this is sufficient in view of the fact that both clamping members 40 and 41 are of identical design and the layout is symmetrical with reference to the center line 45. FIGS. 7 and 8 show but the empty housing 3 of the base member 1 in order to more clearly show some further details.

To each pull lever member 42 is allocated a drive means which serves to swivel the pull lever member 42 from the rest position shown in FIGS. 5 and 6 firstly into an initial position and, after the work piece carrier member 2 having been put onto the base member 1, into the operating position in which a clamping force is generated. The drive means comprises two hydraulically or pneumatically operated working cylinders 46 and 47 with operating pistons 48 and 49 moving in opposite directions; the working cylinders 46 and 47 are located in the housing block 4. The pistons 48 and 49 are received in two coaxial cylinder bores 50 and 51 whereby the centrally located operating chambers 52 of the two working cylinders 46 and 47 are interconnected by means of an aperture 53 and whereby the outer operating chambers 54 are sealed by means of the cover member 5. The pistons 48 and 49 each are directly connected to one of the pull lever members 42 and can be pressurized on both sides by means of a pressure medium which is alternately fed into the operating chambers 52 and 54.

The housing block 4 is provided, in a portion which is located centrally between the two operating chambers 52, 54 of each working cylinder 46, 47, with a central recess 56 running crosswise to the longitudinal axis of the cylinder bore 50 and 51, respectively, and which is open at the top side 11 of the housing block 4. The associated piston 48 and 49, respectively, is provided with a correspondingly located, continuous recess 57. The pull lever member 42 is provided with an elongate shaft portion 58 which penetrates the recess 56 in the housing block 4 leading to the cylinder bore 50 and 51, respectively, and the recess 57 in the piston 48 and 49, respectively. During the operation of the clamping members, a lateral surface portion 59 of the recess 56 in the housing block 4 serves for longitudinally guiding the shaft portion 58. Moreover, the shaft portion 58 of the pull lever member 42 is provided with lateral shoulders 60, and the recess 57 in the piston 48 and 49, respectively, is provided with lateral steps 61, whereby the shoulders 60 and the steps 61 are inclined by a certain wedge angle with reference to the motion axis of the pistons 48 and 49, respectively, and together constitute a wedge gear assembly. Preferably, the aforementioned wedge angle is chosen such that the wedge gear assembly 60, 61 is self-locking under the influence of the clamping force effective at the pull lever member 42. Each of the pistons 48 and 49 is under the influence of a pressure spring 62 and 63, respectively, which supports the frictional forces of the self-locking wedge gear assembly 60, 61.

The pull hook member 42 is under the influence of the force of a pressure spring 66 which is effective along the longitudinal axis of the shaft portion 58 of the pull lever member 42. The pressure spring 66 is located in an eccentrically arranged bore 67 of the shaft portion 58 and rests on a bottom plate 68 which in turn is fixed to the housing block 4 and which covers the recess 56 provided therein towards the bottom. Moreover, the bottom plate 68 is provided with a threshold member 69 forming a stop for the lower end of the shaft portion 58. The threshold member 69 is thus provided at the lower end of the recess 56 in the housing block 4.

The pull lever member 42 with its shaft portion 58 is kept in a vertical rest position under the influence of the pressure springs 63 and 65 as well as of the wedge gear assembly 60, 61 whereby the shaft portion 58 rests with its shoulders 60 on the steps 61 of the piston recess 57 and laterally on the lateral surface 59 of the housing recess 56. The terminal edges of the shoulders 60 and of the steps 61 facing the lateral surface 59 thereby rest on each other and together form a knife edge bearing 70 which serves as a swiveling bearing for the pull lever member 42 during the initial phase of the piston stroke.

For the supply of pressure medium to the operating chambers 52 and 54 of the working cylinders 46 and 47, the longitudinal side of the housing block 4 is provided with two threaded inlet bores 75, 76 (FIGS. 1, 7 and 8) to which pressure pipes can be connected and which each are connected to one of the operating chambers 52 and 54, respectively. As can be seen in FIGS. 7 and 8, the inlet bore 75 directly leads into the central operating chambers 52 which are interconnected by the aperture 53, while the inlet bore 76 is connected to the outer operating chambers 54 of the two working cylinders 46 and 47, respectively. The last named connection leads at both sides from the inlet bore 76 via a longitudinal channel 77 and a recess 78 provided at the inner side of the cover member 5 to the outer operating chamber 54. The aforementioned supply channels for the pressure medium are not shown in FIGS. 5 and 9–11 for clarity's sake.

Due to the symmetrical design of the clamping apparatus, the work piece carrier member 2 could be positioned on and clamped to the base member 1 in two different positions rotated by 180° with regard to each other, if no special measures are taken. In order to avoid this alternative and to ensure an unambiguous positioning of the work piece carrier member 2 on the base member 1, the top surface 11 of the base member 1 is provided with a plurality of protruding pin members 79 which are asymmetrically arranged thereon, and the bottom surface 9 of the work piece carrier member plate 7 is provided with corresponding bores 80 in order to receive the aforementioned pins 79 (FIGS. 1–4 and 6). Under these circumstances, the work piece carrier member 2 can be correctly put onto the base member 1 only if the work piece carrier member 2 takes a position during the start of the clamping operation in which the pins 79 and the bores 80 coincide.

The clamping apparatus shown in the drawings comprises means for cleaning the aligning elements at the beginning of the clamping operation and for keeping them clean during a machining operation. In other words, prior to finally clamping the work piece carrier member 2 on the base member 1, the aforementioned cleaning means are operated.

The cleaning of the aligning elements is effected by blowing pressurized air against them. For this purpose, the housing 3 of the base member 1 is provided with a piping to lead pressurized air to all contact surfaces of the aligning elements, as will be further explained hereinafter with reference to FIGS. 1, 2 and 5–7. The upper edge portion of the housing 3 is provided with an annular channel 85 which is formed by corresponding recesses in the cover members 5 and in the peripheral strip members 6. According to FIGS. 2 and 6, the pressurized air is led from an opening 86 via a vertical channel 87 and a horizontal channel 88 to the annular channel 85. In the interior of the housing block 4, on the one hand, horizontal conduits 89 lead from the annular channel 85 to vertically arranged jet nozzles 90 which open up in the center of the stop surfaces 13 (FIG. 7). On the other hand, horizontally arranged jet nozzles 91 are directly connected to the annular channel 85, the longitudinal axes of the jet nozzles 91 being tangentially directed to the operating edges of the linear aligning elements 16, 18 and 20 (FIG. 2, 5 and 6).

Moreover, the housing 3 is provided with an endless row of vertical slots 92 along the entire periphery of its top surface 11, said slots starting at the annular channel 85 and open up into the top surface 11. According to FIGS. 5 and 7, the slots 92 are formed, on the one hand, between the housing block 4 and, on the other hand, between the cover members 5 and peripheral strip elements 6 and separated from each other only by means of short support lands (not shown). By means of the pressurized air escaping from the slots 92, an air curtain can be realized between the housing block 4 and the work piece carrier plate member 7 prior to finally putting together and clamping the work piece carrier member 2 to the base member 1. Thereby, the inner region containing the aligning elements is protected against dirt and dust.

Finally, the peripheral edge portion of the top surface 11 of the housing block 4 is provided with a sealing strip member 93 made of elastically resilient material which, upon clamping the work piece carrier plate member 7 to the base member 1, rests on the work piece carrier plate member 7 and air tightly seals the interior of the chamber between the work piece carrier member 2 and the base member 1. The sealing strip member 93 comprises an obliquely upwardly projecting sealing lip 94 such that, if necessary, air can flow from the interior outwards, but not from the outside to the interior.

Besides the opening 86 for the supply of pressurized air, a further opening 95 is provided (FIG. 1), which is connected to the annular channel 85 in the same way as the opening 86 and which can be used for connecting a suction pipe for an operation under vacuum or under pressure, as one chooses, or for connecting a gauge for monitoring the pressure. If not connected in a way as explained herein above, this opening 95 is to be sealed or omitted.

The operation of the clamping apparatus described herein before is as follows:

Prior to putting the work piece carrier member 2 onto the base member 1, the outer operating chambers 54 of the working cylinders 46 and 47 are pressurized by means of a pressure medium which is fed via the inlet bore 76 (FIG. 8). Under the influence of the pressure medium, the pistons 48, 49 move towards each other in the direction of the arrow 100 and contrary to the force of the pressure springs 62, 63. Thereby, the pistons 48, 49 engage the associated pull lever member 42 at its shaft portion 58 at the level of the knife edge bearing 70, while the lower end of the shaft portion 58 is held back by the threshold member 69. Thus, the lower end of the shaft portion 58 of the pull lever member 42 abuts the threshold member 69 as the pistons 48, 49 move towards each other. Thus, the pull lever members 42 are swiveled from their rest position (FIG. 5) around the swiveling axis constituted by the knife edge bearing 70 into the initial position according to FIG. 9, during the further backward stroke of the pistons 48, 49.

During a first phase of approach of the carrier member 2 against the base member 1, the pull lever members 42 of the clamping members 40, 41, being in their initial positions, penetrate the corresponding apertures 43 of the work piece carrier plate member 7, and the pins 79 penetrate the bores 80 if the work piece carrier member 2 takes the correct orientation. In this first phase of approach, the aligning elements cooperating in pairs do not yet engage each other, but can have a mutual distance of several mm. In this moment at the latest, the pressurized air is fed to the contact areas of the aligning elements for the purpose of cleaning them. Upon further approaching the work piece carrier member 2 towards the base plate member 1, the engagement of the pins 79 with the bores 80 cause a coarse positioning of the work piece carrier member 2 such that the linear aligning element pairs take a mutual position which is suitable for the cooperation thereafter.

Figure 9:
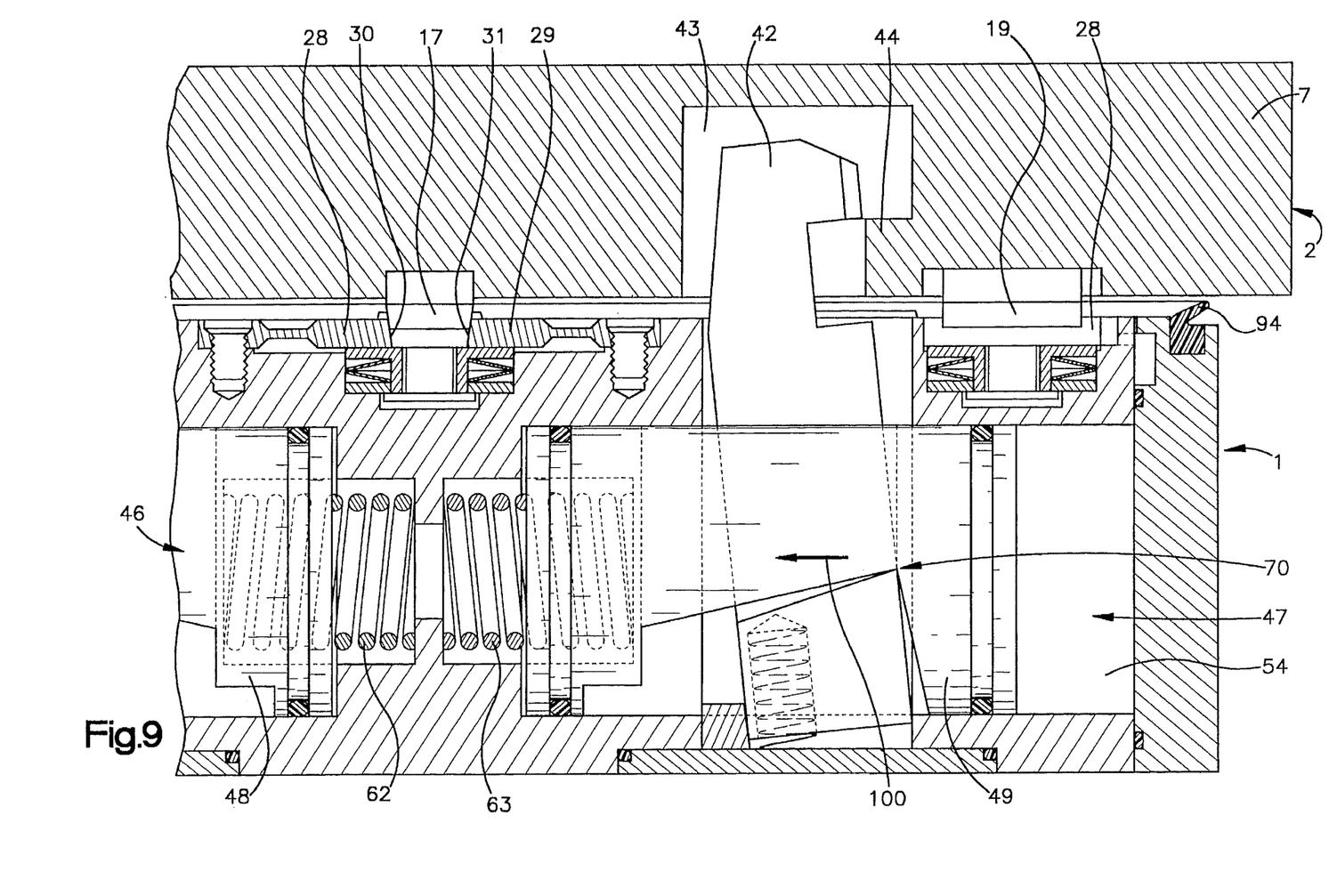
FIGS. 9–11 show partial longitudinal sectional views of the base member according to FIG. 5 and of the work piece carrier member, taken along the line V—V in FIG. 4, in three different consecutive phases of the coupling operation between the base member and the work piece carrier member.

In FIG. 9, there is shown the first phase of the joining together of the work piece carrier member 2 and the base member 1. In this first phase, for the time being, only the linear aligning elements 15,16; 17,18; 19,20 (FIGS. 2 and 4) meet each other in pairs, whereby the conical aligning ruler members 15, 17, 19 penetrate the centering slots between the corresponding centering tongue members 28, 29 and come into contact with their operating edges 30, 31. Thus, the position and the angular orientation of the work piece carrier member 2 in the X-Y-plane is provisionally fixed. In this phase, the work piece carrier plate member 7 reaches an interim position closest to the base member 1 which renders possible a swiveling movement of the pull lever members 42 into their operating positions in which the projections 44 in the associated apertures 43 of the work piece carrier plate member 7 can be engaged. The work piece carrier plate member 7 has not yet reached the stop surfaces 13 at the base member 1 in this phase of operation, and the gap between the plate member 7 and the sealing lip 94 is still open, whereby the air curtain which is effective until this gap is closed prevents any dirt and dust to enter the space between the plate member 7 and the base member 1.

Figure 10:
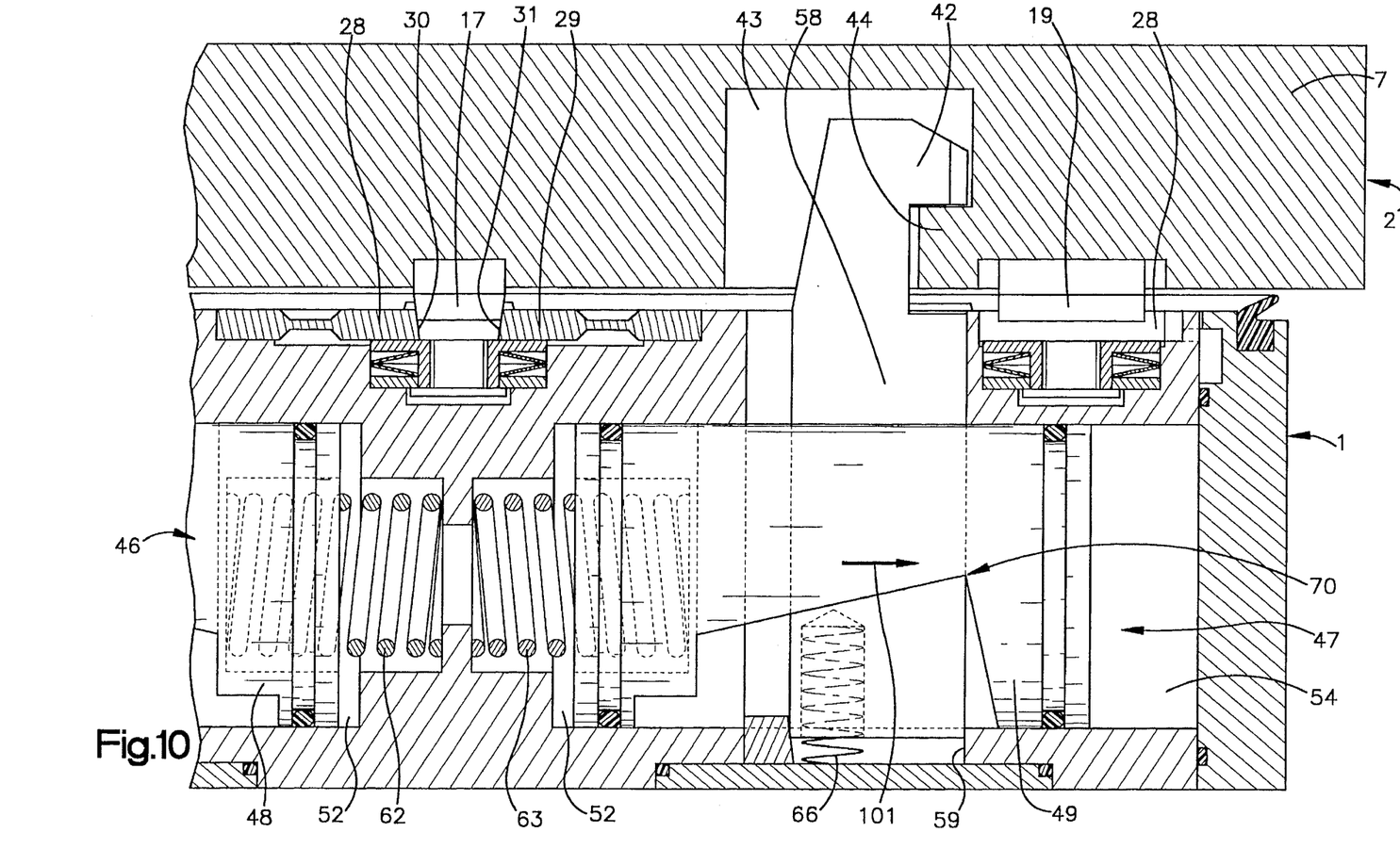

In FIG. 10, the next phase of the joining together of the work piece carrier member 2 and the base member 1 is shown. In this phase, the work piece carrier member 2 continues to rest on the aligning members 16, 18, 20 of the base member 1 only with its aligning ruler members 15, 17, 19. If the supply of pressure medium to the outer operating chambers 54 of the working cylinders 46, 47 is interrupted and diverted to the inner operating chambers 52, the pistons 48, 49 move toward the outer side in the direction of arrow 101. Thereby, an operating stroke of the pistons 48, 49 is initiated. In an initial phase of this operating stroke, a swiveling of the pull lever members 42 from their oblique rest position into the operating position in which their shaft portions 58 take a position perpendicular to the piston axis is rendered possible. The two pull lever members 42 are swiveled in clockwise direction around the knife edge bearing 70 under the influence of the pressure spring 66 acting on a lower portion of the shaft portion 58 until the shaft portion 58 abuts against the lateral surface 59 of the recess 56 in the housing block 4, whereby the pull lever member 42 simultaneously engages the projection 44 in the aperture 43 of the work piece carrier plate member 7.

Figure 11:
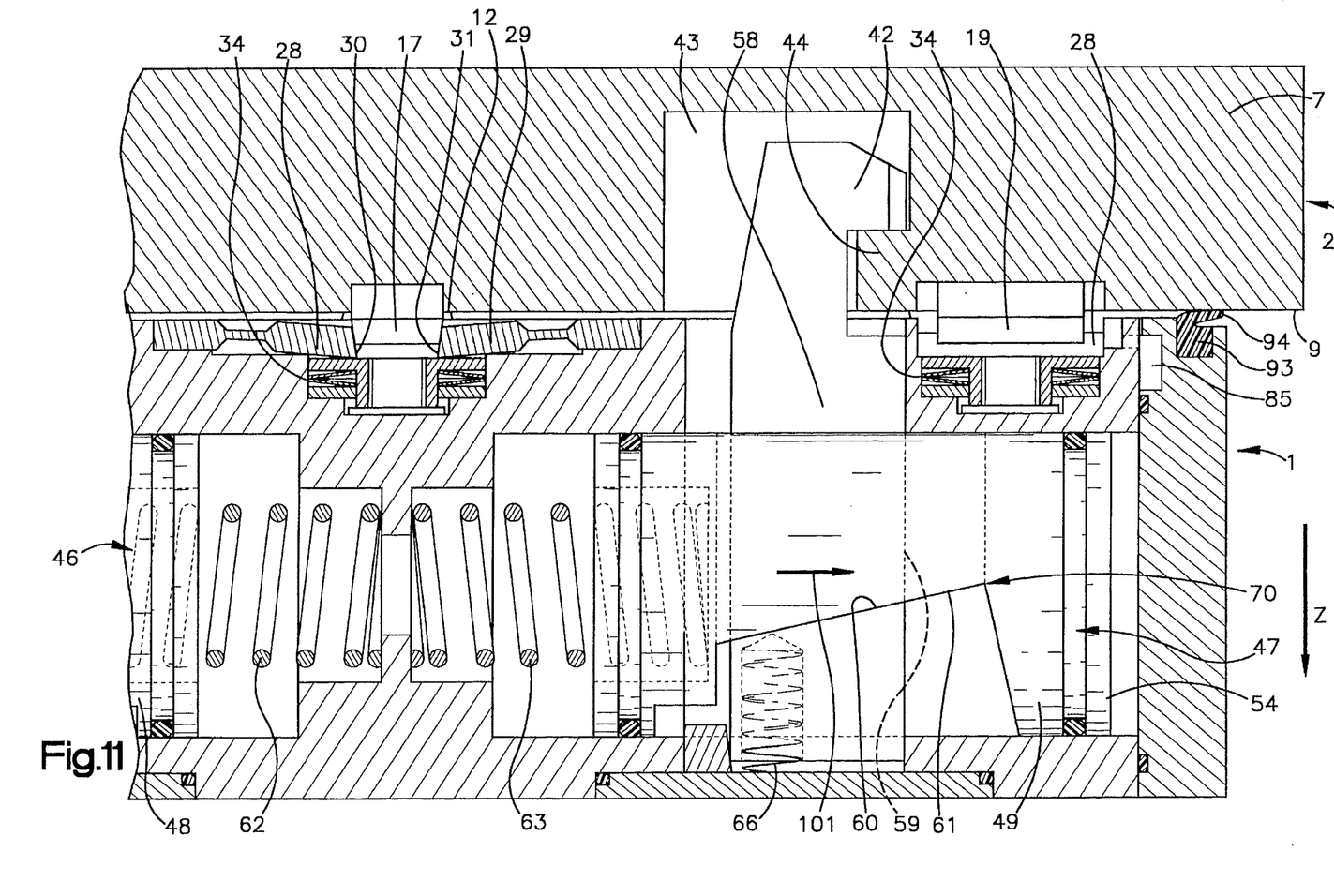

Upon the continuation of the operating stroke of the pistons 48, 49 up to the final phase of the joining together of the work piece carrier member 2 and the base member 1, as shown in FIG. 11, the wedge gear assembly 60, 61 comes into operation. Under the influence thereof, the driving force of the pistons 48, 49 is transformed into a clamping force exerted by the pull lever members 42. Thereby, the oblique steps 61 provided at each of the pistons 48 and 49 glide along the correspondingly oblique shoulders 60 provided at the shaft member 58 of the associated pull lever member 42. Thereby, the shaft member 58 held back at the lateral surface 59 of the recess 56 is pulled downwards along the lateral surface 59 which serves as a guiding surface. Simultaneously, the knife edge bearing 70 at the pistons 48 and 49, respectively, which is no longer needed in this phase, moves away from the associated shaft portion 58.

Under the influence of the clamping force generated in the way as described above and exerted by the two pull lever members 42 in the direction of the Z-axis, the work piece carrier member 2 is displaced towards the base member 1 to such a degree that the work piece carrier plate member 7 abuts against the stop surfaces 13 of the projections 12 provided on the base member 1. Thereby, the exactly defined position of the work piece carrier member 2 in the direction of the Z-axis is set. Simultaneously, the conical aligning ruler members 15, 17, 19 further penetrate the centering slot of the aligning elements 16, 18 and 20 whereby the centering tongue members 27, 28 of the aligning elements 16, 18 and 20 are bent and the Belleville spring members supporting them are pressed together. In this way, the contact between the linear aligning elements cooperating in pairs is intensified and the work piece carrier member 2 is aligned with regard to the base member in a well defined position as far as the three coordinate axes X, Y and Z and the angular orientation is concerned. This well defined position can repeatedly be taken with a high degree of accuracy. Thus, the work piece mounted on the work piece carrier member 2 is clamped always in exactly the same position e.g. at the machining area of a machining apparatus, even if it is repeatedly removed therefrom and clamped again.

In the final phase shown in FIG. 11, the sealing strip member 93 with its sealing lip 94 pressed onto the lower surface 9 of the plate member 7 seals the aligning elements from the atmosphere and thereby protects them from environmental influences. The supply of pressurized air into the annular channel 85 for generating a stream of air directed against the aligning elements and for maintaining the aforementioned air curtain can be interrupted in this phase. Where appropriate, the pressurized air supply pipe can be removed from the base member 1.

The wedge gear assembly 60, 61 located between the pistons 48 and 49, respectively, and the pull lever members 42 advantageously is designed such that it is self locking once the clamping operation is terminated, i.e. the driving force of the pistons has ceased. The clamping condition is maintained in this case by the clamping force exerted on the pull lever members 42 and supported by the force of the pressure springs 62 and 63, respectively, which acts on the pistons 48 and 49, respectively. In this way, it is rendered possible to remove also the supply pipes for feeding pressure medium to the working cylinders 46, 47 from the base member 1. Consequently, the clamping apparatus, free from any connections and pipes, can be freely manipulated and moved in the working area of a machining apparatus.

What is claimed is:

1. An apparatus for clamping a work piece in a well defined position in the working area of a machining apparatus, comprising:
   a base member adapted to be fixed in the working area of the machining apparatus;
   a work piece carrier member adapted to be put onto said base member and to be clampingly fixed to said base member, said work piece carrier member being adapted to receive a work piece to be machined;
   first aligning means provided on said base member and second aligning means provided on said work piece carrier member, said first and second aligning means cooperating in pairs with each other upon putting said work piece carrier member onto said base member to align the position of said work piece carrier member in three coordinate axes running perpendicularly to each other and with regard to its angular orientation;
   clamping means generating a clamping force which keeps said work piece carrier member in a position defined by said first and second aligning means on said base member;
   said first and second aligning means comprising first aligning element pairs including first and second stop surfaces cooperating with each other to define the position of said work piece carrier member in a coordinate axis (Z) running parallel to the direction of said clamping force generated by said clamping means;
   said first and second aligning means comprising two laterally located and one centrally located second aligning element pairs including each a conically cross sectioned aligning ruler member as well as a counterpart member having a matching centering slot, said aligning ruler members and said counterpart members cooperating with each other to define the position of said work piece carrier member in a coordinate plane which is set by the two other coordinate axes (X and Y);
   two opposite end portions of said base member and said work piece carrier member each being provided with one of said laterally located second aligning element pairs which together define the position of said work piece carrier member, -(a) in a coordinate axis (Y) running perpendicular to the connection line between said two second aligning element pairs, and -(b) with regard to its angular orientation, and a central portion of said base member and said work piece carrier member between said two laterally located second aligning element pairs being provided with a further one of said centrally located second aligning element pairs to define the position of said work piece carrier member in the third coordinate axis (X);
   said clamping means comprising two synchronously operated clamping members, each one thereof being located between said centrally located second aligning element pair and one of said laterally located second aligning element pairs.

2. An apparatus according to claim 1 in which said base member comprises a housing block, the upper side of which being provided with said first stop surfaces of said first aligning element pairs and with the one aligning elements of said second aligning element pairs, and in which said clamping members are located.

3. An apparatus according to claim 1 in which said work piece carrier member comprises a work piece carrier plate member, the plane bottom side of which being provided with the other aligning elements of said second aligning element pairs.

4. An apparatus according to claim 1 in which said conically cross sectioned aligning ruler members are arranged on said work piece carrier member and said counterpart members having a matching centering slot are arranged on said base member.

5. An apparatus according to claim 4 in which each of said counterpart members having a matching centering slot comprises two separate centering tongue members individually connected to said housing block of said base member and equipped with operating edges located opposite to each other and delimiting said centering slot.

6. An apparatus according to claim 5 in which said centering tongue members are elastically flexible.

7. An apparatus according to claim 6 in which said centering tongue members comprise a bending portion constituted by a region with reduced cross sectional area.

8. An apparatus according to claim 7 in which each associated pair of centering tongue members are supported by a separate spring bank member.

9. An apparatus according to claim 1 in which each of said two clamping members comprises a swivelable pull lever member which engages said work piece carrier plate member when it is in its operating position.

10. An apparatus according to claim 9 in which said work piece carrier plate member of said work piece carrier member is provided with two apertures in each of which being provided a projection, whereby each of said pull lever members, upon putting said work piece carrier member onto said base member, penetrates the corresponding aperture in said plate member and engages said projection if said pull lever member is in its operating position.

11. An apparatus according to one of the claim 9 in which there is assigned to each pull lever member a driving means for swiveling said pull lever member from its rest position into its operating position and for generating said clamping force.

12. An apparatus according to claim 11 in which said driving means comprises two working cylinders located in said housing block and having two pistons moving in opposite directions, said pistons being adapted to be pressurized on both sides by means of a pressure medium and being directly operatively connected to one of said two pull lever members.

13. An apparatus according to claim 12 in which said housing block comprises, in a portion which is located centrally between said two operating chambers of each working cylinder, a central recess running crosswise to the longitudinal axis of the cylinder bore which is open at the top side of the housing block, whereby the associated piston is provided with a correspondingly located continuous recess.

14. An apparatus according to claim 12 in which said pull lever member is provided with an elongate shaft portion which penetrates said recess in said housing block and said recess in said piston and which is connected to said piston by means of a wedge gear assembly transforming the driving force of said piston to a clamping force of said pull lever member.

15. An apparatus according to claim 13 in which said shaft portion of said pull lever member is provided with lateral shoulders and said recess in said piston is provided with lateral steps, whereby said shoulders and said steps are inclined by a certain wedge angle with reference to the motion axis of said pistons and together constitute said wedge gear assembly.

16. An apparatus according to claim 13 in which said shaft portion of said pull lever member is longitudinally guided along a lateral guiding surface in said recess of said housing block and rests with its shoulders on said steps of said recess in said piston under the influence of a longitudinally effective spring member.

17. An apparatus according to claim 13 in which the operating stroke of said piston serves in an initial phase for swiveling said pull lever member from an oblique rest position into an operating position in which said shaft portion runs perpendicularly to the central axis of said piston.

18. An apparatus according to claim 13 in which the end edges of said shoulders and said steps which are facing said guiding surface of said shaft portion together form a knife edge bearing which is effective as a swiveling bearing for said pull lever member during an initial phase of the operating stroke of said piston.

19. An apparatus according to claim 13 in which a threshold member is provided at the lower end of said recess in said housing block against which the lower end of said shaft portion of said pull lever member abuts as said pistons move in opposing directions, such that said pull lever member is swiveled from said rest position into the initial position.

20. An apparatus according to one of the claim 13 in which means are provided for maintaining the clamping force of said pull lever member during an interruption of the supply of pressure medium to said piston.

21. An apparatus according to claim 20 in which the wedge angle of said wedge gear assembly is chosen such that said wedge gear assembly is self locking under the influence of the clamping force when the driving force of said piston has ceased after termination of the clamping operation.

22. An apparatus according to claim 21 in which there is provided a pressure spring member being effective on said piston and supporting the friction force of said self locking wedge gear assembly.

23. An apparatus according to claim 1 in which the space between said housing block and said work piece carrier plate member containing said first and second aligning means is air tightly sealed if said work piece carrier member is clampingly fixed to said base member.

24. An apparatus according to claim 23 in which said housing block comprises a sealing strip member made of elastically resilient material and located along a peripheral portion of its upper side, said sealing strip member resting on said work piece carrier plate member when it is clamped to said base member.

25. An apparatus according to claim 1 in which means are provided for cleaning said first and second aligning means by blowing pressurized air against said first and second aligning means.

26. An apparatus according to claim 1 in which means are provided for generating an air curtain between said housing block and said work piece carrier plate member in order to prevent dirt and dust from penetrating the space there between prior to clamping said work piece carrier member to said base member.

27. An apparatus according to claim 25 in which said housing block comprises an endless pressurized air channel to which are connected jet nozzle means directed against the contact areas of said first and second aligning means and slots for the generation of said air curtain.

* * * * *

UNITED STATES PATENT AND TRADEMARK OFFICE
CERTIFICATE OF CORRECTION

PATENT NO. : 5,487,539
DATED : January 30, 1996
INVENTOR(S) : Basil Obrist

It is certified that error appears in the above-indentified patent and that said Letters Patent is hereby corrected as shown below:

Column 14, line 32, after "to" delete --one of the--.

Column 15, line 24, after "to" delete --one of the--.

Signed and Sealed this

Third Day of September, 1996

Attest:

BRUCE LEHMAN

Attesting Officer     Commissioner of Patents and Trademarks